(12) United States Patent
Schultz et al.

(10) Patent No.: US 7,399,179 B2
(45) Date of Patent: Jul. 15, 2008

(54) INJECTION UNIT MOUNT

(75) Inventors: Gregory Allan Schultz, Bolton (CA); Valentin Diaconu, Etobicoke (CA)

(73) Assignee: Husky Injection Molding Systems Ltd., Bolton, ON (CA)

( * ) Notice: Subject to any disclaimer, the term of this patent is extended or adjusted under 35 U.S.C. 154(b) by 225 days.

(21) Appl. No.: 11/505,049

(22) Filed: Aug. 15, 2006

(65) Prior Publication Data

US 2008/0044514 A1  Feb. 21, 2008

(51) Int. Cl.
 *B29C 45/22* (2006.01)
(52) U.S. Cl. .................................... 425/574
(58) Field of Classification Search ............... 425/567, 425/568, 569, 570, 572.571, 574
See application file for complete search history.

(56) References Cited

U.S. PATENT DOCUMENTS

| | | | | |
|---|---|---|---|---|
| 3,205,536 | A | * | 9/1965 | Funck ......................... 425/574 |
| 3,464,091 | A | * | 9/1969 | Bielfeldt ..................... 425/574 |
| 3,555,617 | A | * | 1/1971 | Wessel et al. ............... 425/576 |
| 3,600,755 | A | * | 8/1971 | Cook .......................... 425/574 |
| 4,731,005 | A | | 3/1988 | Hehl |
| 5,183,621 | A | * | 2/1993 | Yukihiro et al. .......... 264/297.2 |
| 5,219,586 | A | * | 6/1993 | Yukihiro et al. ............. 425/183 |
| 5,714,176 | A | | 2/1998 | Wurl et al. |
| 5,780,078 | A | * | 7/1998 | Chen .......................... 425/574 |
| 5,935,494 | A | | 8/1999 | Wurl et al. |
| 6,068,810 | A | | 5/2000 | Kestle et al. |
| 6,425,753 | B1 | | 7/2002 | Eppich |
| 6,478,572 | B1 | | 11/2002 | Schad |
| 7,033,158 | B2 | | 4/2006 | Becker et al. |
| 2004/0156939 | A1 | | 8/2004 | Ickinger |
| 2004/0213871 | A1 | | 10/2004 | Wohlrab et al. |
| 2005/0048162 | A1 | | 3/2005 | Teng et al. |
| 2006/0147578 | A1 | | 7/2006 | Konno |
| 2007/0237853 | A1 | * | 10/2007 | Hsu ........................... 425/570 |

FOREIGN PATENT DOCUMENTS

| | | |
|---|---|---|
| CA | 1253308 | 5/1989 |
| CA | 1294405 | 1/1992 |
| CA | 2122963 | 11/1994 |
| DE | 4344340 A1 | 6/1995 |
| EP | 1604755 | 12/2005 |
| JP | 9052164 A | 2/1997 |
| JP | 09239772 | 9/1997 |

OTHER PUBLICATIONS

Extracts from the Husky G-Line brochure, Published 1999.
Extracts from the Husky Thixomolding brochure, Published 1999.

* cited by examiner

*Primary Examiner*—Tim Heitbrink (57) ABSTRACT

Disclosed is: (i) a mounting system of an injection unit of an injection molding system, and (ii) an injection molding system having a mounting system of an injection unit, amongst other things.

14 Claims, 9 Drawing Sheets

INJECTION UNIT MOUNT

TECHNICAL FIELD

The present invention generally relates to, but not limited to, molding systems, and more particularly, to, but not limited to, (i) a fluid distributor and operational drive of a molding system and/or (ii) a molding system having a fluid distributor and operational drive, amongst other things. The fluid distributor and operational drive may be applied to either a metal molding system or a plastic molding system.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System, all manufactured by Husky Injection Molding Systems Limited (Location: Bolton, Ontario, Canada; www.husky.ca).

Prior art fluid distribution systems and operational drives of a molding system have been applied to both metal and plastic molding systems.

U.S. Pat. No. 5,714,176 (Inventor: Wurl et al; Published: 1998-02-03) discloses a drive for a molding machine. A linear drive and a rotary drive driven by one motor, a servo motor, operate to rotate and translate the screw. Again, this drive comprises multiple component parts.

U.S. Pat. No. 5,935,494 (Inventor: Wurl et al; Published: 1999-08-10) discloses a hybrid drive for a molding machine. A piston is translatable by a fluid to inject melt and an electric motor and transmission operate to rotate the screw. The electric motor also drives a hydraulic pump. However, this drive comprises multiple component parts, multiple manifolds, and requires a transmission.

U.S. Pat. No. 6,068,810 (Inventor: Kestle et al; Published: 2000-05-30) discloses a plasticizing unit having a plasticizing screw, an injection piston connected to the screw, a quill connected to the piston, and hydraulic cavity formed by the piston and a quill end face. Hydraulic fluid is transferred to the hydraulic cavity to move the piston and screw away from the quill. The screw and piston are subsequently moved towards the quill to displace hydraulic fluid out of the hydraulic cavity and cause back pressure. The back pressure is counteracted by acting on the back of the quill.

U.S. Pat. No. 6,478,572 (Inventor: Schad; Published: 2002-11-12) discloses a drive with a single electric motor operates the screw and a hydraulic motor. Again, this drive comprises multiple component parts and associated manifolds.

United States Patent Application Number 2004/0213871 (Inventor: Wohlrab et al; Published: 2004-10-28) discloses a hybrid drive for a molding machine. A piston is translatable by a fluid to inject melt and an electric motor is coupled to the screw for rotation of the screw. However, this drive also comprises multiple component parts and multiple manifolds.

United States Patent Application Number 2005/0048162 (Inventor: Teng et al; Published: 2005-03-03) discloses a hybrid drive is illustrated with a hollow shaft electric motor and an external piston cylinder arrangement attached to the back end of the motor. Again this drive comprises multiple component parts and associated manifolds.

European Patent Number 1,604,755 (Inventor: Martini et al; Published: 2005-12-14) discloses an injection assembly with pressure booster for pressure die-casting machines, which includes a main injection piston that is actuated by a pressurized liquid that is allowed to flow by a check valve, and a booster piston, which is arranged so that it can slide axially with respect to the main piston, wherein the multiplier piston is separated from the check valve and is arranged downstream thereof along the advancement direction of the main injection piston.

The prior art systems and drives as disclosed above appear to include separate and multiple components. For example, multiple fluid distribution manifolds, separate drives, and transmissions. They require multiple hoses, clamps, and suffer from losses. They are neither compact nor integrated with a block acting as a manifold. The hydraulic actuators tend to comprise multiple component parts held together by tie rods. Standard cone valves tend to have poor control and provide less acceleration because fluid tends to leak past the cone valve upon actuation of the valve.

Extracts from the Husky G-Line brochure (published: 1999) discloses a piston type accumulator (i) mounted directly on top of an injection unit and (ii) connected to an injection hydraulic manifold that is mounted on the injection piston cylinder end cap.

Extracts from the Husky Thixomolding brochure (published: 2003) discloses mounting of two piston type accumulators directly on top of an injection unit and connected to an injection piston cylinder end cap.

SUMMARY

According to a first aspect of the present invention, there is provided a mounting system of an injection unit of an injection molding system, the mounting system including, amongst other things: (i) a fluid distributor and an operational drive, (ii) a carriage, (iii) a pair of mounts disposed with the fluid distributor and the operational drive, and (iv) a third mount disposed with the carriage, the third mount adjustable about a horizontal axis and adjustable about a lateral axis.

According to a second aspect of the present invention, there is provided an injection molding system, having, amongst other things: (i) an injection unit, (ii) a frame, (iii) a fluid distributor and an operational drive, (iv) a carriage, (v) a mounting system, including, amongst other things: (a) a pair of mounts disposed with the fluid distributor and the operational drive, and (b) a third mount disposed with the carriage, the third mount adjustable about a horizontal axis and adjustable about a lateral axis.

There are a number of technical effects, amongst other technical effects, of the aspects of the present invention. There is a reduction in separate components providing fluid distribution and drive capability. Multiple manifolds are reduced with many hoses, clamps, and losses reduced. The drive is compact having an integrated manifold and translational drive, and an additional rotational drive secured to the manifold.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
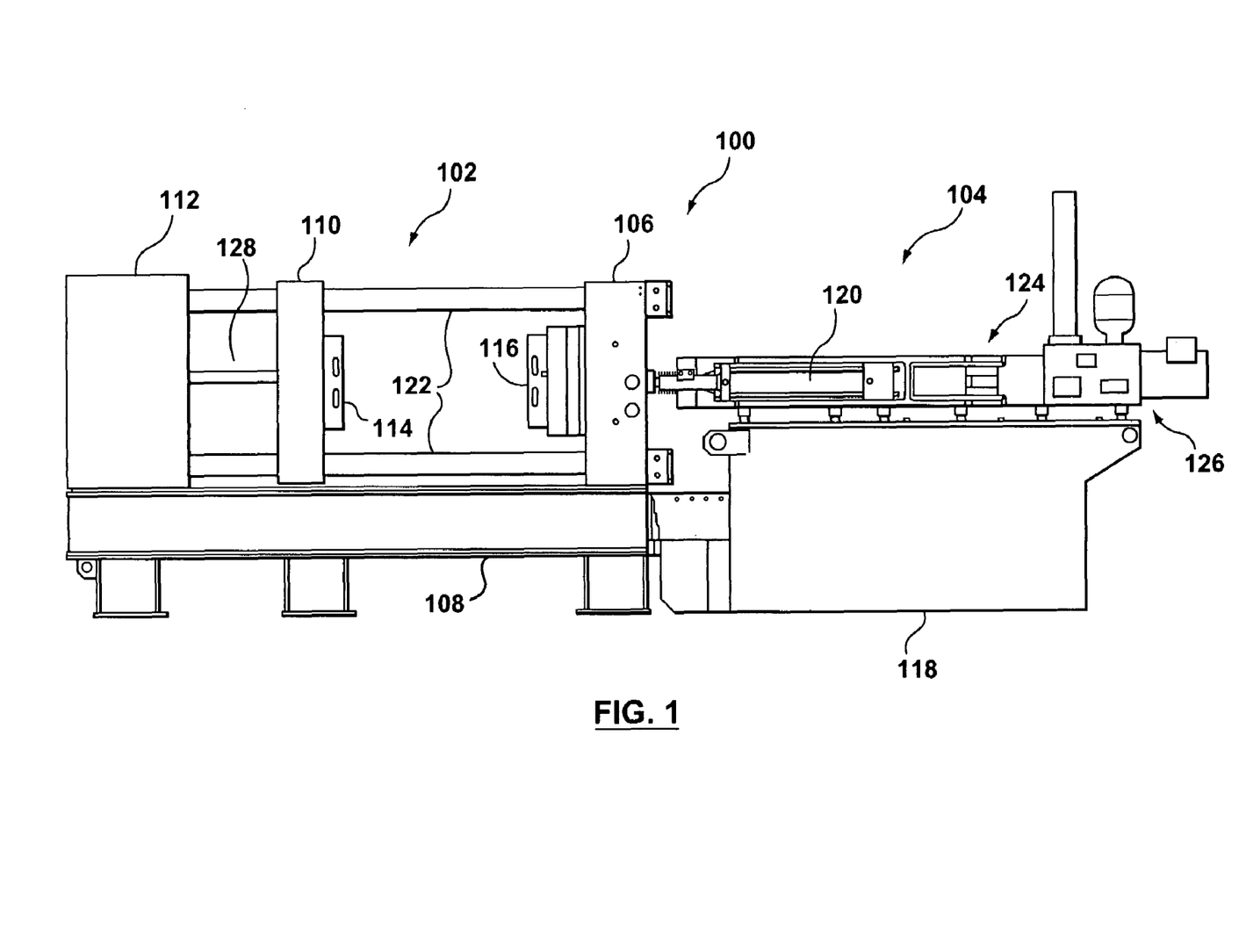
FIG. 1 is a schematic side view representation of an injection molding system.

FIG. 1 depicts an embodiment of a molding system 100. The molding system 100 may be a plastics injection molding system, a metal injection molding system, or a hybrid plastics/metal molding system. The molding system 100 includes, amongst other things, an injection unit 104 and a clamp unit 102.

The clamp unit 102 includes a stationary platen 106 and a moving platen 110. A clamp block 112 and clamp column 128 may also be associated with the moving platen 110. The clamp block 112 and the stationary platen 106 are interconnected by four tie bars 122. The stationary platen 106 and clamp block 112 are supported by the frame 108. A mold hot half 116 may be mounted to a face of the stationary platen 106. The mold hot half 116 may also include a hot runner, or may be of the cold runner type. A least one cavity is located with the mold hot half 16. A mold cold half 114 may be mounted to a face of the moving platen 110. At least one core is located with the mold cold half 114. The cavity and the core provide a space to form a part. The molding system 100 also includes a control system to operate the molding process and control the molding system.

Operational power is provided to the moving platen 110. In an embodiment, the fluid distributor and operational drive is a bidirectional drive capable of rotating a locking nut piston onto interrupted teeth of the clamp column 128, and translating the clamp column 128 to provide tonnage to the mold. In another embodiment, the fluid distributor operational drive is a translatable drive capable of translating the moving platen 110.

The injection unit 104 includes a carriage and barrel 124 supported on the frame 118. The carriage includes carriage cylinders 120 on each side. One end of each carriage cylinder 120 is coupled to the stationary platen 106 of the clamp unit 102. The carriage cylinders 120 are actuated through hydraulics and provide an ability to move the carriage and barrel 124 towards and away from the stationary platen 106. Mounted on an end of the carriage is a fluid distributor and operational drive 126.

In an embodiment, operational power is provided to a reciprocating screw located within the barrel. In this embodiment, the fluid distributor and operational drive 126 is a bidirectional drive (that is, a fluid distributor and bidirectional drive apparatus 126) that is capable of translating the screw and rotating the screw. In another embodiment, the fluid distributor and operational drive 126 is a translatable drive capable of translating an injection piston in a shooting pot of a two stage, or P type injection unit 104.

In addition, those skilled in the art will appreciate that either the translatable drive version or the bidirectional drive version may be applied to other aspects of the injection unit 104, clamp unit 102, or molding system 100 to translate, and/or translate and rotate operational members associated with the machine. In addition, both versions of the fluid distributor and operational drive 126 may distribute fluid to other hydraulically actuated devices on the injection unit 104, clamp unit 102, or molding system 100.

FIGS. 2, 3, 4, 5, and 6 depict the fluid distributor and operational drive 126. A block 200 forms a manifold for distributing fluid, for example, hydraulic oil. The block 200 includes at least one fluid inlet port, at least one fluid outlet port, and a fluid distribution circuit (not depicted). The fluid distribution circuit is preferably formed in the block 200 material (as internal circuit and/or circuits). According to variant, the fluid distribution circuit is formed by external circuits, such as hoses. According to another variant, the fluid distribution circuit may be a combination of internal and external circuits.

At least one control valve (214, 216, 218, 222, 400, 402, and 404) interacts with the fluid distribution circuit to control the flow of fluid to various devices, for example, the carriage cylinders 120. The at least one control valve (214, 216, 218, 222, 400, 402, and 404) may be integral with the block 200 or external to the block 200 or a combination of internal and external. In addition, the at least one control valve (214, 216, 218, 222, 400, 402, and 404) may be proportional or non-proportional depending upon the requirements of the various devices.

The valve to control the drive 838 (reference is made to FIG. 8) for injection may be a spool cut valve, such as (but not limited to), the Model DSHR40 V01 Spool manufactured by MOOG Hydrolux (www.moog.com), for improved control and acceleration of the injection process. With this type of valve, there is no flow or leakage of fluid for the first 3.5 mm of spool travel. The first 3.5 mm of spool travel is called the "dead band". The dead band provides for a higher (improved) acceleration (it is optional to use a spool cut valve that has a dead band or that has no a dead band).

Since persons skilled in the art of molding systems have a base line of knowledge, further details are not provided for (i) the valves, (ii) the hydraulic circuit, (iii) examples of what the valves control, and/or (iv) examples of the hydraulic circuits needed for the case of the injection unit and/or the case of a clamp unit.

A first interface 202 (reference is made to FIG. 3) is disposed on one side of the block 200. The first interface 202 provides a mount and connection to a device, for example, to the carriage and barrel 124. Alternatively, the first interface 202 could provide a mount and connection to a moving platen 110 for applying tonnage, or movement, or both.

Figure 3:
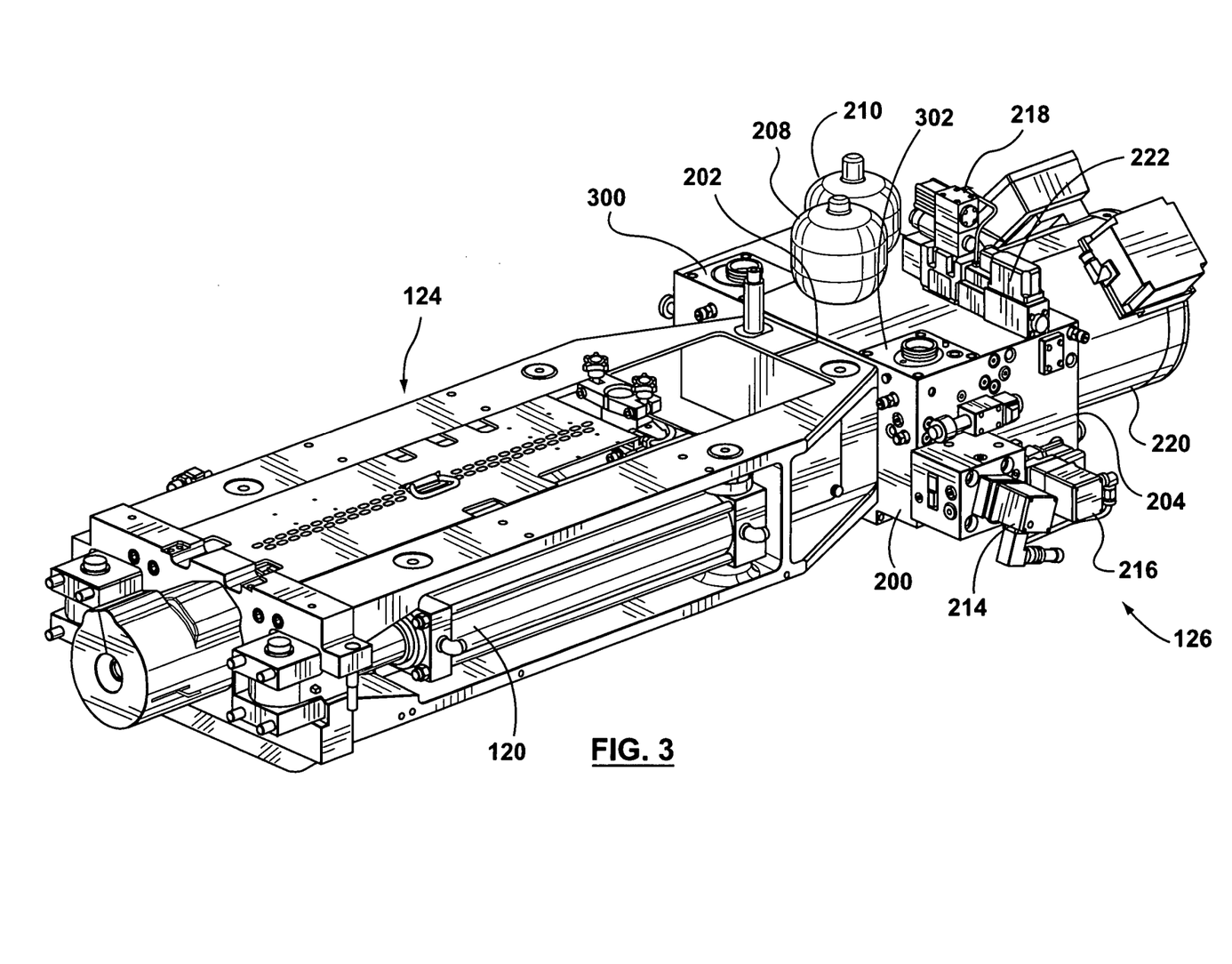
FIG. 3 is a perspective side view representation of an injection unit and corresponding drive with two energy storage devices removed.
Figure 4:
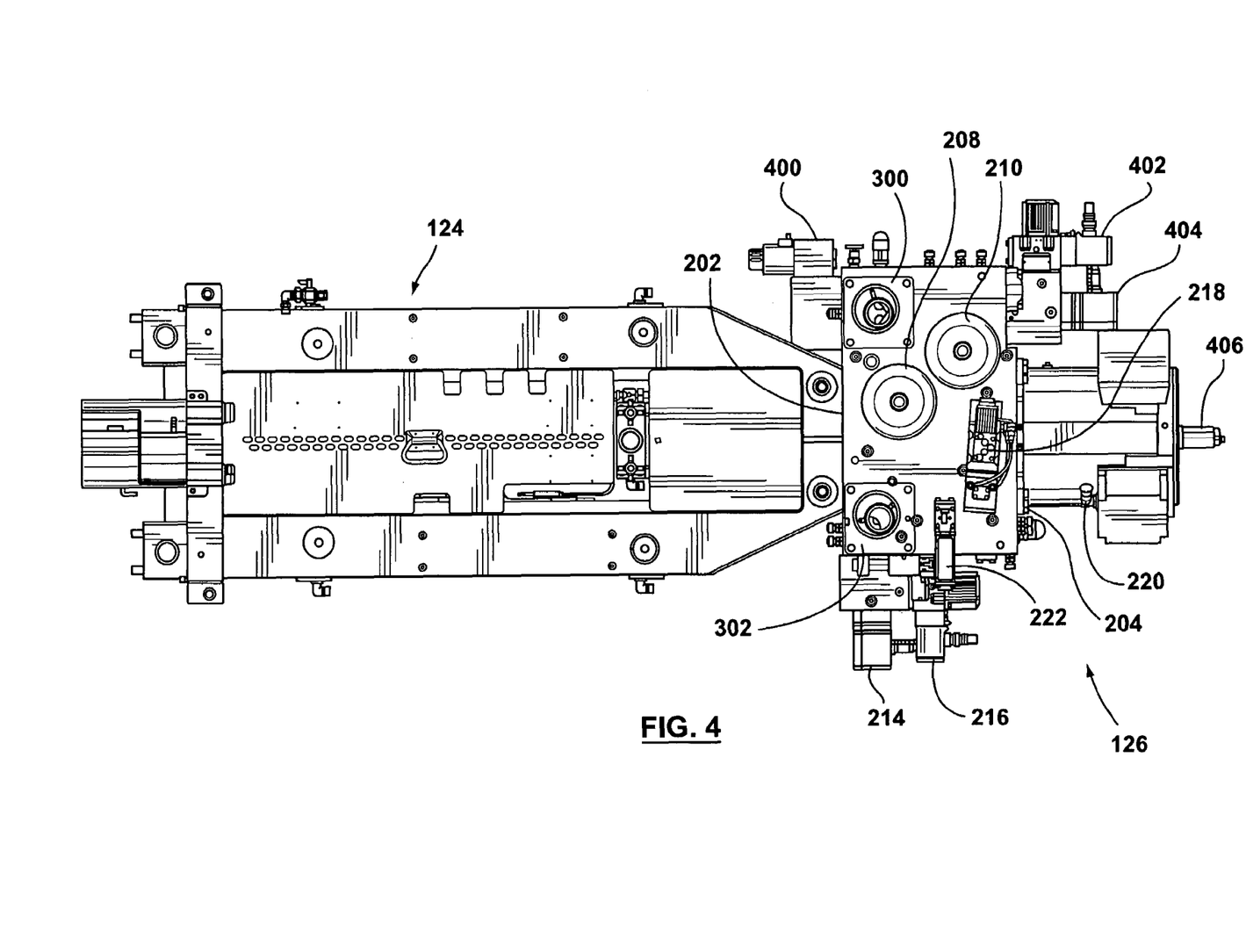
FIG. 4 is a top view representation of an injection unit and corresponding drive with two energy storage devices removed.

A second interface 204 is disposed on an opposite side of the block 200. The second interface 204 provides a mount and connection to an electric motor 220, preferably, a hollow shaft electric motor. Alternatively, the second interface 204 provides a mount and connection to a hydraulic motor, or an electric motor.

Figure 2:
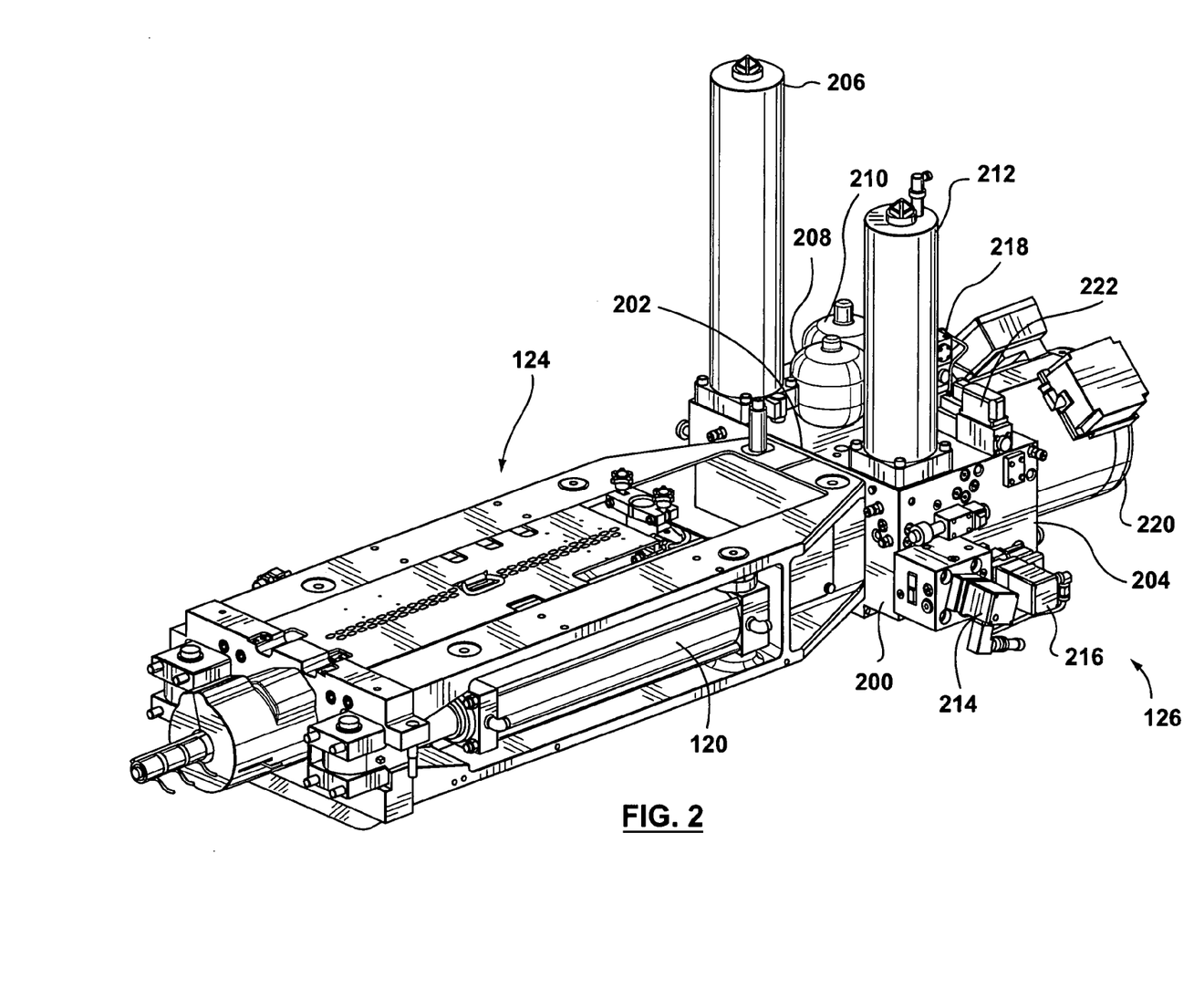
FIG. 2 is a perspective side view representation of an injection unit and corresponding drive.

Optionally, at least one energy storage device port (300, 302) in the block 200 interacts with the fluid distribution circuit to receive and store a volume of fluid. Connected to the at least one energy storage device port (300, 302) is at least one energy storage device (206, 208, 210, 212). The at least one energy storage device (206, 208, 210, 212) may be external to the block 200 or internal to the block 200. When more than one energy storage device (206, 208, 210, 212) is applied, they may be of equal capacity or differing capacity depending upon the needs of the system.

Figure 5:
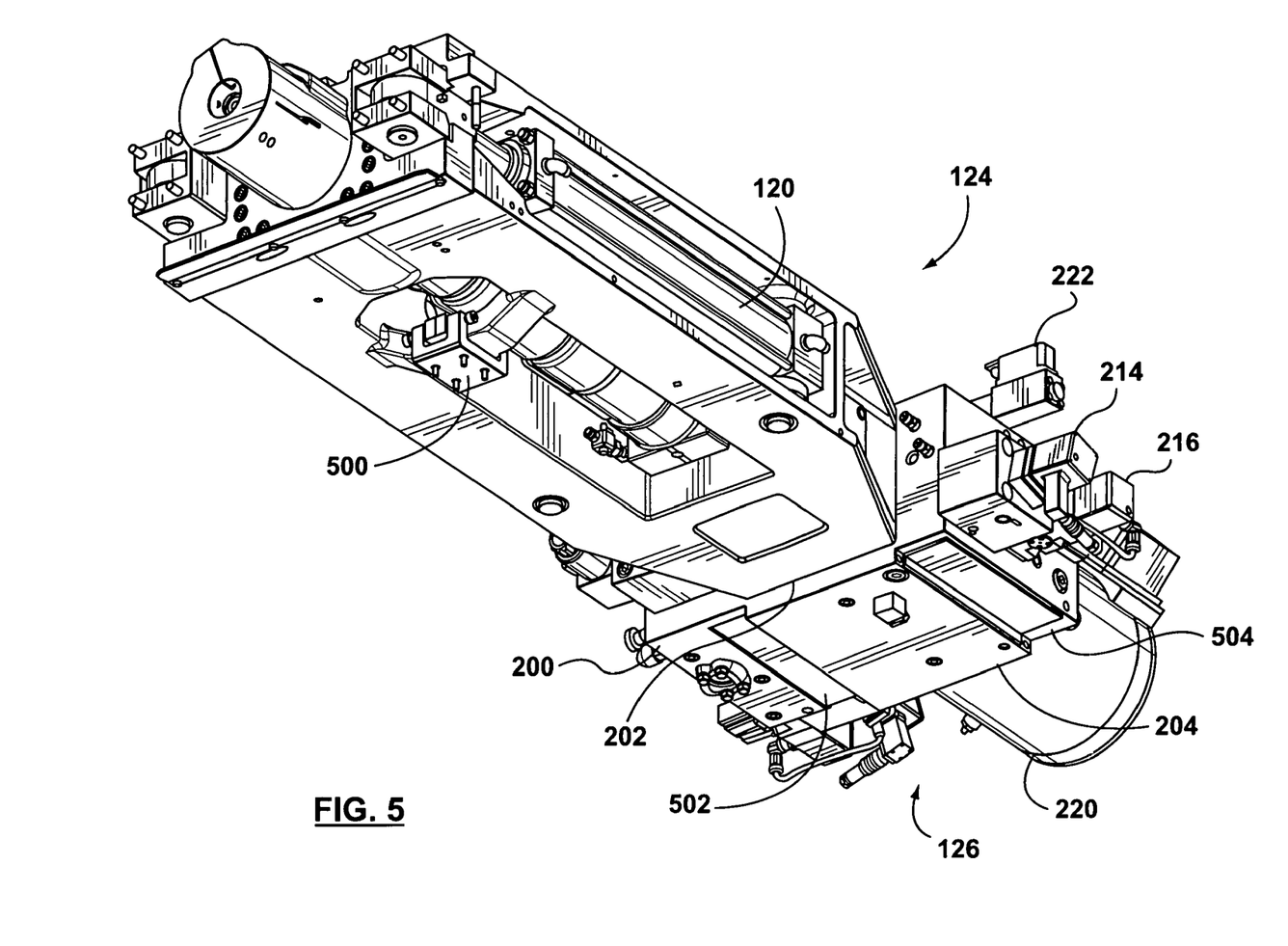
FIG. 5 is a perspective bottom view representation of an injection unit and corresponding drive.
Figure 6:
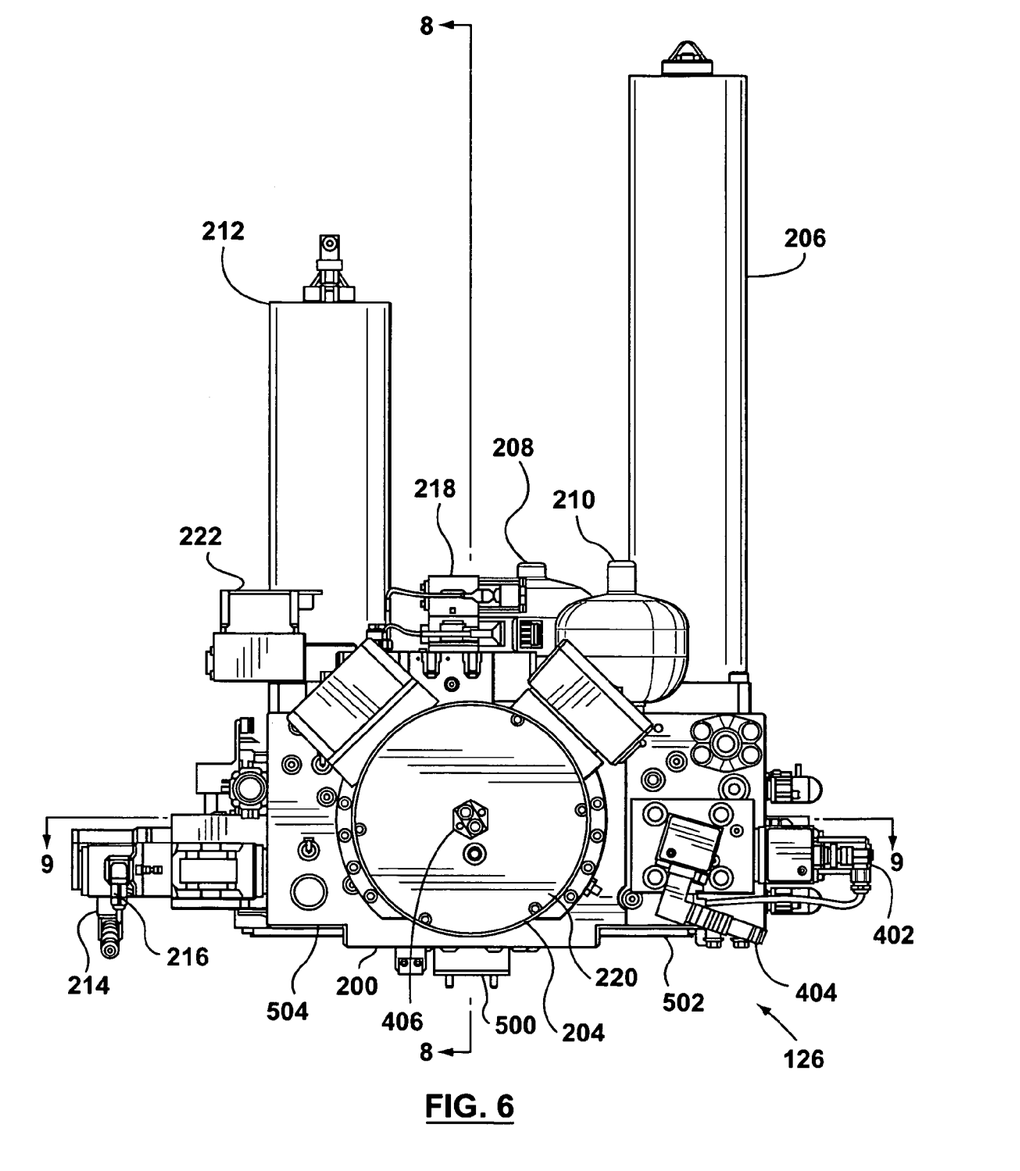
FIG. 6 is an end view representation of the corresponding drive.

FIG. 5 and FIG. 6 depict an injection unit mount. A tripod mount is formed between the injection unit 104 and the injection unit frame 118. A first mount 502 (also called a wear pad) is formed or disposed on one side of the block 200. A second mount 504 (also called a wear pad) is formed or disposed on the other side of the block 200. The first mount 502 and the second mount 504 interface with rails and guides to permit or accommodate fore and aft sliding (slidable) adjustment of the carriage and barrel 124. The first mount 502 and the second mount 504 may be formed in the block 200 material or be a component attached to the block 200 material.

The third mount 500 is disposed on a frame member of the carriage. The third mount 500 is adjustable about the horizontal and vertical axes. Adjusting the third mount 500 provides alignment of the barrel 700 (reference is made to FIG. 7) with a mold or sprue bushing. The third mount 500 interfaces with a rail and guide on the injection unit frame 118. The third mount 500 is adjustable about the vertical axis to provide an up/down adjustment, and about the lateral axis to provide a left/right adjustment of the barrel. This provides a fine adjustment of the barrel (and thus of the machine nozzle that is mounted to the barrel). Based on the foregoing description, the binding of the aft linear bearings should not occur, and it is not necessary to mount an injection unit via a tripod mount.

Figure 8:
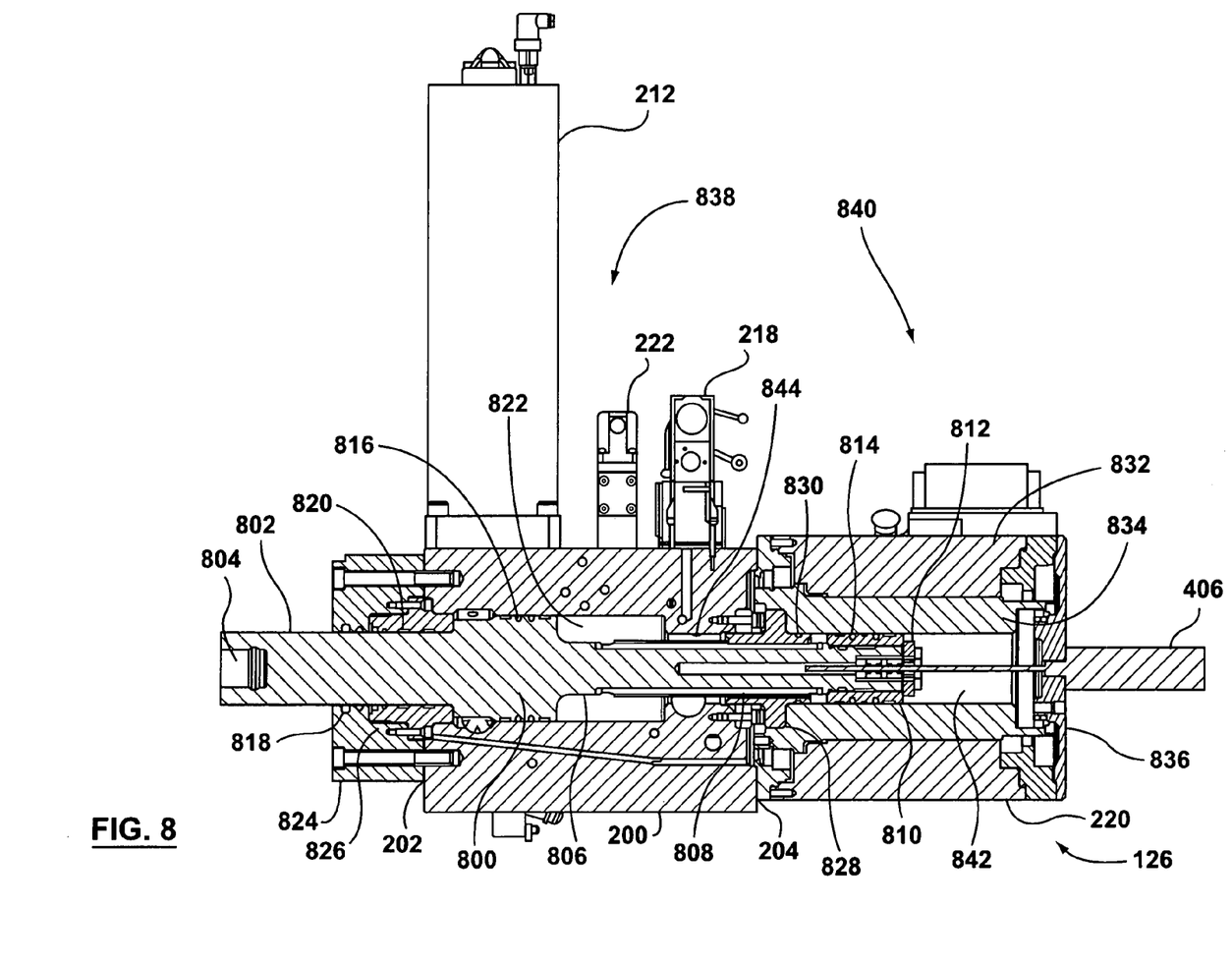
FIG. 8 is an enlarged cross sectional side view representation taken along line 8-8 from FIG. 6 illustrating the corresponding drive.
Figure 9:
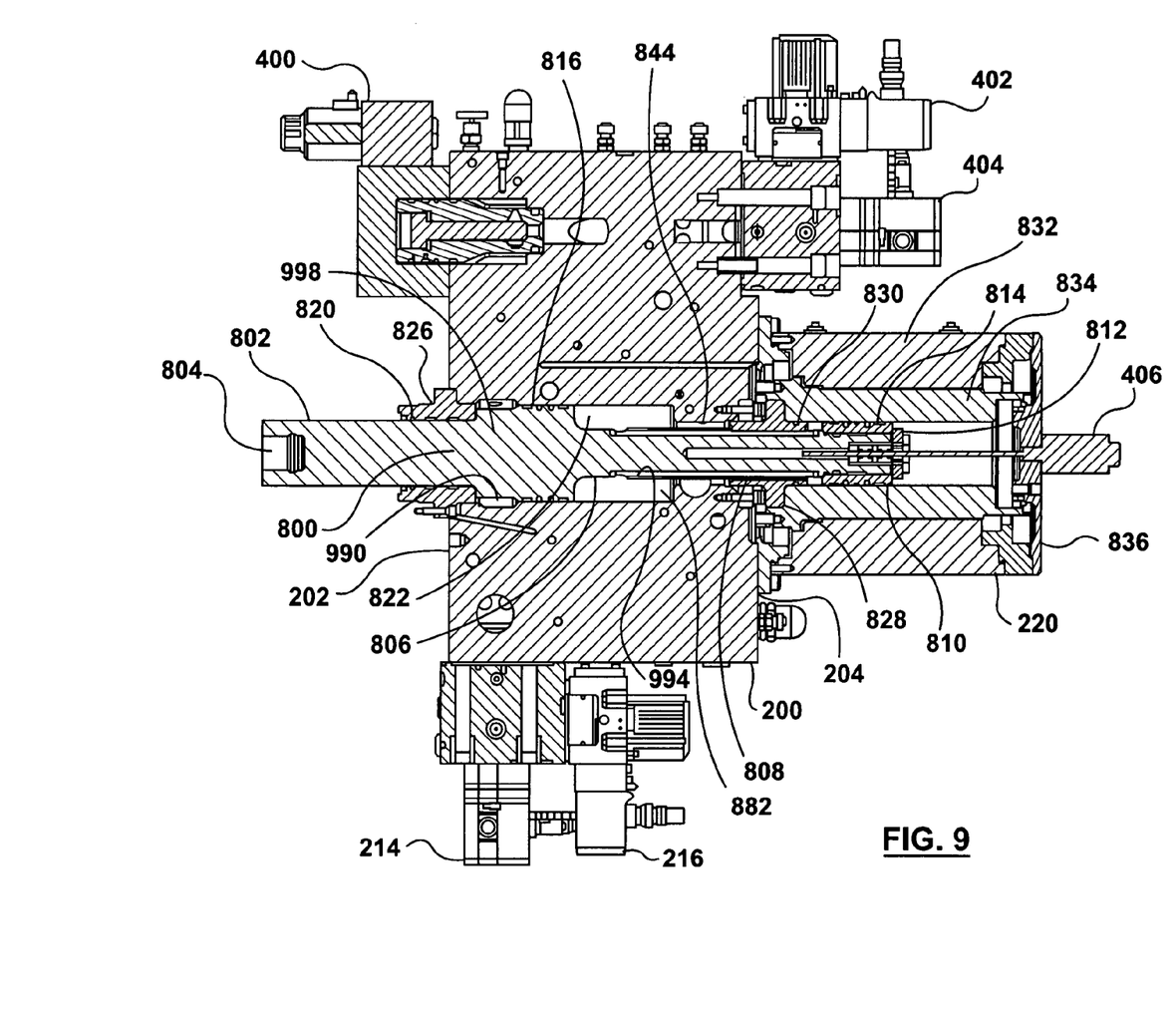
FIG. 9 is an enlarged cross sectional top view representation taken along line 9-9 from FIG. 6 illustrating the corresponding drive.

Referring ahead to FIG. 8 and FIG. 9, there is depicted the fluid distributor and operational drive 126. A block 200 forms a manifold for the distribution of a fluid such as hydraulic oil. The block 200 includes an inlet and an outlet to receive and discharge fluid. The block 200 also includes at least one fluid circuit as illustrated by the various bores and lines in the sectional view of the block 200. Multiple circuits are provided for controlling multiple devices in addition to the drive 838. Valves (214, 218, 400, 402) connect to the fluid circuit through bore channels in the block 200. A valve may be mounted on the block 200 or integral with block as shown with valve 400. The valves control the flow of fluid from the fluid circuit to a machine member for actuation by the fluid. A cylinder bore 822 is formed in the block 200, preferably about a central area of the block 200. Alternatively, the cylinder bore 822 may be formed out of a liner or insert material disposed within a bore of the block 200. The cylinder bore 822 is of a diameter to receive a piston section 998 for reciprocation by the fluid. The cylinder bore 822 is also interconnected to the fluid circuit of the block 200. One end of the cylinder bore 822 is open to the surface of the block 200 that includes the first interface 202. A second smaller diameter pass thru bore 844 is formed in an opposite end of the cylinder bore 822 for receiving and passing a portion of a shaft member 800. The shaft member 800 is a translatable member and/or a bidirectional member.

The shaft member 800 is an elongate generally cylindrical member. One end of the shaft member 800 includes an interface member 802. The interface member 802 could be integral with the shaft member 800 or separate. The interface member 802 may include a coupler 804 or suitable interface at one end for engagement with a machine member. The coupler may be a threaded bore, but other forms of couplers are contemplated. The other end of the shaft member 800 includes an operational member 806. Again the operation member 806 could be integral with the shaft member 800 or separate. Intermediate the ends of the shaft member 800 is a piston section 998 (also called a piston 998) for cooperation with cylinder bore 822. Intermediate the piston section 998 (also called a piston) and the cylinder bore 822 are seals 816. Disposed on a section of the operational member 806 is an interface 808. Preferably, the interface 808 portion on the operational member 806 is a spline. The spline is of a diameter smaller than the diameter of the pass thru bore 844 such that rotation of the shaft member 800 does not interfere with the splines and pass thru bore 844.

A surface of the block 200 with the first interface 202 and an inside diameter of the cylinder bore 822 cooperate to receive an interface member end cap 826. The interface member end cap 826 may include a support bearing for the interface member 802 as well as seals (seals/bearings generally illustrated as 820). A surface of the interface member end cap 826 provides a stop for the piston section 998 of the shaft member 800. While the interface member end cap 826 is illustrated bolted to the carriage mount 824, alternatively the interface member end cap 826 could be bolted or secured directly to the block 200.

The carriage mount 824 interconnects the carriage and barrel 124 to the first interface 202 of the block 200. The carriage mount 824 may also include bearings for support of the interface member 802 as well as additional seals (seals/bearing generally illustrated as 818).

A drive cap 828 is disposed on a surface of the second interface 204 of the block 200. The drive cap 828 has a central opening and complementary interface 808. Preferably, the interface 808 portion of the drive cap 828 is a spline for complementary engagement with the spline of the operational member 806. The drive cap 828 is secured to the block 200 by fasteners. The drive cap 828 is rotatable by a motor. Preferably the drive cap 828 communicates with the rotor of a hollow shaft electric motor for rotation of the drive cap 828. Rotation of the drive cap 828 rotates the shaft member 800 through the interface 808 while permitting translational movement of the shaft member 800. The drive cap may include bearings and seals (generally illustrated as 830).

An end of the operational member 806 includes a smaller diameter section to receive a second piston member 810 (which may also be called a piston). The second piston member 810 is retained over the smaller diameter section by a shoulder formed on the smaller diameter section engaging an end surface of the second piston member 810 and a piston member end cap 812 secured to the end of the operational member 806. The outer diameter of the second piston member 810 is sized to ensure the second piston member 810 fits within the hollow shaft of the motor 220. The hollow shaft of the motor 220 forms a cylinder 842. The second piston member 814 may include seals or rings 814 intermediate an outer surface of the second piston member 814 and the surface of the cylinder 842. The second piston member 814 may reciprocate within the cylinder 842 during operation of the drive.

The piston member end cap 812 may be secured to the end of the operational member by bolts or threads. The piston member end cap 812 may also include a central opening to receive a sensor 406 for determining a position of the shaft member 800.

The motor 220 includes a stator 832, a hollow shaft rotor 834, and mount for securing the motor 220 to the block 200 at the second interface 204. The hollow shaft rotor 834 may be directly or indirectly engaged to the drive cap 828 such that rotation of the rotor provides a rotation of the drive cap 828, or a component of the drive cap 828. The motor end cap 836 also includes a central bore to receive a position sensor 406.

A position sensor 406 provides positional information signals to indicate the position of the shaft member 800. Preferably the position sensor 406 is a Temposonic™ rod (manufactured by MTS Systems Corporation, Sensors Division of the U.S.A.; Telephone: 919.677.0100; http://www.mtssensors.com). A portion of the position sensor 406 is disposed within a small diameter central bore located in the operational member 806 and the position sensor 406 is mounted on an end of the motor 220, with a portion extending into the central area of the motor 220.

In summary, the fluid distributor and operational drive 126 includes a first drive 838 formed in the block 200 by the combination of the cylinder 822 and shaft member 800 to provide translational movement. The drive 126 also includes a second drive 840 formed by the motor 220 and shaft member 800 to provide rotational movement.

Referring back to FIG. 7, there is depicted an exemplary embodiment of the fluid distributor and operational drive 126 with respect to the connection to a carriage and operation of a screw in a barrel 700. The first interface 202 of the block 200 provides for alignment and connection to the carriage mount 824 and is secured by bolts. The coupler 804 of the interface member 802 provides a connection to a screw (not shown) disposed in the bore 702 of the barrel 700. The barrel includes an input port 704 for receiving material and an exit port 706 for injecting a shot of melted material.

Figure 7:
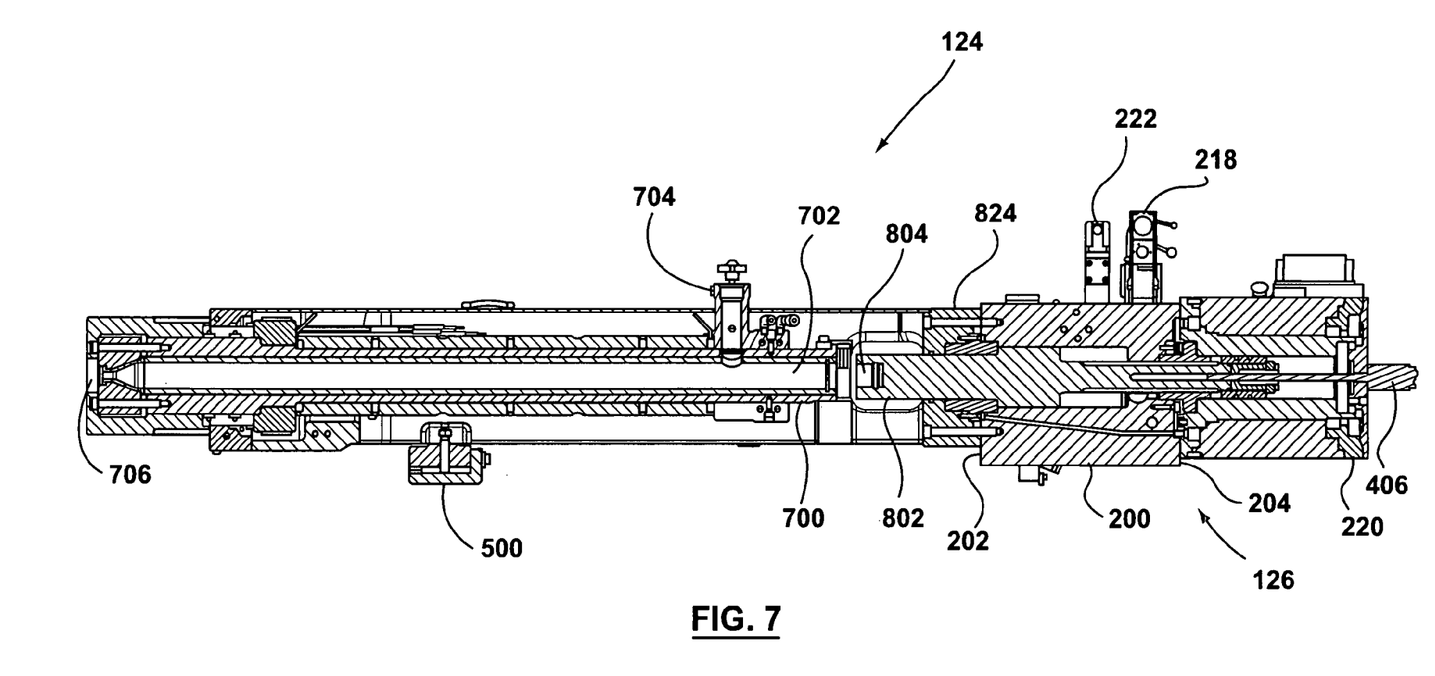
FIG. 7 is a cross sectional side view representation taken along line 8-8 from FIG. 6 illustrating an injection unit and corresponding drive.

The fluid distributor and operational drive 126 operates as a bidirectional drive, power and control is applied to the motor 220 which in turn rotates the shaft member 800 and the screw in the barrel 700. Feedstock (plastic or metal chips) is supplied to the input port 704 and is conveyed foreword in the barrel by the rotating screw. As a shot of melt accumulates in front of the screw, the screw moves aft which causes the shaft member 800 to move aft. The shaft member 800 moves aft in the cylinder 822 and aft into the hollow shaft rotor 834 of the motor 220. Once the desired amount of shot has been accumulated in front of the screw, fluid pressure is applied to the cylinder 822 in the block 200 to translate the shaft member 800 and screw forward to inject the shot into a mold.

The piston 998 and the second piston member 810 cooperate in accordance with the following approaches: (i) the cylinder bore 822 is pressurizable by a hydraulic fluid that is fluidly transmitted to the cylinder bore 822 while a cylinder 900 is connected to tank (that is, connected to tank pressure) so that once the hydraulic fluid located in the cylinder bore 822 is pressurized, the piston 998 is made to move or translate, and/or (ii) defined between the piston 998 and the second piston member 814 there is a channel 994 that is used to fluidly communicate (using the hydraulic fluid) the piston 998 with the second piston member 810, so that when the second piston member 810 is made to translate via actuation of the electric motor 220 (actuation of the electric motor 220 causes the piston 814 to move, which in turn move the fluid through the channel 994 and then the fluid pushes against the piston 998), the fluid in the channel 994 becomes pressurized so as to, in turn, pressurize the cylinder bore 822 which then permits translation of the piston 998.

Alternatively, the fluid distributor and operational drive 126 operates as a bidirectional drive for applying tonnage to a mold, power is applied to the motor 220 which in turn rotates a locking piston nut about the clamp column 128 to engage complementary teeth on the nut with the clamp column 128. Fluid pressure is applied to the cylinder 822 in the block 200 which translates the clamp column 128 and applies pressure to the mold. Once cooling of the part has completed, fluid pressure is removed from the cylinder 822 in the block 200 and the locking piston nut is again rotated by the motor 220 such that the complementary teeth are disengaged. Then the moving platen may be moved to open the mold.

Alternatively, the fluid distributor and operational drive 126 operates as a translatable drive for a shooting pot, a shot of melt is transferred into the shooting pot moving an injection piston aft which causes the shaft member 800 to move aft. Once the desired amount of shot has been transferred into the shooting pot, fluid pressure is applied to the cylinder 822 in the block 200 to translate the shaft member 800 and shooting pot piston forward to inject the shot into the mold.

Alternatively, the fluid distributor and operational drive 126 operates as a translatable drive for stroking a mold. Fluid pressure may be applied on either side of the piston member 810 in the cylinder 822 of the block 200 to translate the shaft member 800. The drive 126 is disposed intermediate the moving platen 110 and the stationary platen 106 and operations to move the moving platen 110.

For the alternatives wherein the fluid distributor and operational drive 126 operates as a translatable drive, the second drive 840 is not present and the drive cap 828 simply provides a seal between the block 200 and the operational member 806.

In addition to the exemplary alternatives of the fluid distributor and operational drive 126, the at least one valve (214, 216, 218, 222, 400, 402, 404) also receives fluid from the at least one fluid circuit and may open and close to control other devices on the system when required by the process.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of letters patent are limited only by the scope of the following claims:

What is claimed is:

1. A mounting system of an injection unit of an injection molding system, the mounting system comprising:
    a fluid distributor and an operational drive;
    a carriage;
    a pair of mounts disposed with the fluid distributor and the operational drive to permit slidable adjustment of the carriage; and
    a third mount disposed with the carriage, the third mount adjustable about a horizontal axis and adjustable about a lateral axis to permit adjustment of a barrel and a machine nozzle being mounted with the barrel.

2. The mounting system of claim 1, wherein the pair of mounts is formed in a block of the fluid distributor and the operational drive.

3. The mounting system of claim 1, wherein the pair of mounts includes an insert attached to a block of the fluid distributor and the operational drive.

4. The mounting system of claim 1, wherein the pair of mounts interface with rails and guides to permit fore and aft sliding adjustment.

5. The mounting system of claim 1, wherein the third mount interfaces with rails and guides to permit fore and aft sliding adjustment.

6. The mounting system of claim 1, wherein the third mount interfaces with rails and guides to permit fore and aft sliding adjustment.

7. The mounting system of claim 1, wherein the third mount provides a fine positional location alignment of the barrel with a mold or sprue bushing.

8. An injection molding system, comprising:
   an injection unit;
   a frame;
   a fluid distributor and an operational drive;
   a carriage;
   a mounting system, including:
      a pair of mounts disposed with the fluid distributor and the operational drive to permit slidable adjustment of the carriage; and
      a third mount disposed with the carriage, the third mount adjustable about a horizontal axis and adjustable about a lateral axis to permit adjustment of a barrel and a machine nozzle being mounted with the barrel.

9. An injection molding system as in claim 8, wherein the pair of mounts is formed in a block of the fluid distributor and the operational drive.

10. An injection molding system as in claim 8, wherein the pair of mounts includes an insert attached to a block of the fluid distributor and the operational drive.

11. An injection molding system as in claim 8, wherein the pair of mounts interface with rails and guides to permit fore and aft sliding adjustment.

12. An injection molding system as in claim 8, wherein the third mount interfaces with rails and guides to permit fore and aft sliding adjustment.

13. An injection molding system as in claim 8, wherein the third mount interfaces with rails and guides to permit fore and aft sliding adjustment.

14. An injection molding system as in claim 8, wherein the third mount provides alignment of the barrel with a mold or sprue bushing.

* * * * *